United States Patent Office 3,592,641
Patented July 13, 1971

3,592,641
PROCESS FOR REDUCTION OF AFLATOXIN CONTENT OF OILSEED MEALS BY OZONIZATION
Eric T. Rayner, New Orleans, La., Channasamudram T. Dwarakanath, Mysore, India, and Godfrey E. Mann, New Orleans, and Frank G. Dollear, Pearl River, La., assignors to the United States of America as represented by the Secretary of Agriculture
No Drawing. Filed Jan. 30, 1969, Ser. No. 795,331
Int. Cl. A23k 1/00
U.S. Cl. 99—2
3 Claims

ABSTRACT OF THE DISCLOSURE

This invention relates to a process for lowering the aflatoxin level in peanut and cottonseed meals contaminated with aflatoxin. Contaminated cottonseed and peanut meals hydrated to a level of 22% and 30% respectively were contacted with ozone gas in a covered vessel at atmospheric pressure and heated to temperatures about from 75° C. to 100° C. for periods of about from 60 to 120 minutes to achieve substantial lowering of the aflatoxin content.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for lowering the aflatoxin levels in contaminated agricultural products. Specifically, this invention relates to chemical inactivation of the aflatoxins present in contaminated oilseed meals. More specifically, this invention relates to the use of ozone gas as the reagent, which, in conjunction with heat and moisture, effects substantial reductions in aflatoxin content in contaminated meals.

The main object of this invention is to provide a process which will substantially reduce the aflatoxin levels in contaminated oilseed meals so that these meals may be rendered fit for their conventional uses, primarily in animal feeds. The abbreviation "p.p.b." used herein means parts per billion.

It has recently been recognized that agricultural products may become infected with strains of the mold *Aspergillus flavus* which produce a group of highly toxic substances known collectively as aflatoxins. In England, 100,000 turkey poults died in 1960 because they consumed rations containing a peanut meal infected with *A. flavus*.

The highly toxic nature of the aflatoxins is demonstrated by the fact that the $LD_{50}$ of the $B_1$ component (one of the main toxic components of the aflatoxins) is less than 30 micrograms for day-old ducklings. Furthermore, aflatoxin has produced pathological changes in a wide variety of animal species including trout, poultry, rats, cattle, dogs, swine, and monkeys.

NOTE: In animal feeding studies or toxicological studies, "$LD_{50}$" is the term used to designate a dose quantity which results in the death of 50% of the animals involved in a test.

Additionally, published reports indicate that toxic substances, specifically the aflatoxins M, are secreted in the milk of cows fed rations contaminated with aflatoxins B and G, thus revealing an indirect but inherent hazard to humans consuming the milk from these animals. This would appear to constitute one of the more serious facets of the problem.

Another serious aspect of the problem is that the responsible mold is ubiquitous and is capable of infecting all kinds of agricultural commodities, especially if they are exposed to warm humid conditions. Some of the commodities which have been found to be susceptible to contamination with aflatoxin are peanuts, peanut meal, cottonseed meal, corn, wheat, etc.

Mann, et al., in patent application Ser. No. 746,741, filed July 23, 1968, disclose a process wherein the aflatoxin content of contaminated cottonseed meats, cottonseed meals, and peanut meals is lowered by chemical treatment with aqueous solutions of methylamine. This process, however, is dependent upon contacting the meal particles uniformly with an aqueous solution of methylamine reagent. In the process of the instant invention, gaseous ozone is utilized, which readily permeates into all areas of the meal charge, there to effect a lowering of the aflatoxin content. Another advantage of the present investigation is that the ozone reagent required is readily available, being easily produced from air with suitable equipment. The process is of wide versatility and can be employed to lower aflatoxin levels in materials of all kinds which are contaminated with such toxins. The invention is particularly useful in the treatment of agricultural products—of animal or plant origin—since such materials are especially likely to become contaminated with the *A. flavus* mold when exposed to conditions conducive to mold growth. Typical examples of such materials in the category of vegetative cellular materials are seeds and the residues remaining after extraction of oil therefrom, e.g., peanuts, soybeans, cottonseed, peanut meal, soybean meal, cottonseed meal, flaxseed meal; grains such as wheat, barley, rice, rye, oats, corn, and meals or flours prepared from any of these grains; forages such as alfalfa, clover, grasses, sorghum, bran, cowpeas, ensilage, mixed feeds, etc. Other examples of agricultural products include such materials as fish meal, tankage, dried blood distillery and brewery residues, dried whey, etc.

In general, the treatment in accordance with the invention may be conducted at temperatures in the range of about from 75° to 125° C. The ozone gas is introduced into the meal by means of an inlet tube suitably arranged to discharge the gas deep within the meal charge during the heating and stirring operations. The treatment is conducted in a closed vessel provided with a reflux condenser to return moisture to the product during treatment, thus maintaining the level of hydration constant. The ozone is employed in large excess as compared with the amount of aflatoxin in the material being treated. One can, for example, use during a treatment, 0.1% ozone, based upon the weight of the material being treated. To insure adequate aflatoxin elimination however, it is preferable to use a larger proportion of ozone in a range of about from 0.2% to 0.4% based on the weight of material being treated.

The time of treatment will depend on various factors including the amount of aflatoxin in the starting material, the concentration of ozone in the reaction system, the physical and chemical properties of the material (for example, the particle size of the material, its porosity or density, its fat content, moisture content, etc.) and particularly on the operating temperature employed. As an illustration, we have observed that ozone treatment of cottonseed meal at 0° C. for two hours results in only slight reduction of the aflatoxin $B_1$ content, whereas the same treatment carried out a 100° C. results in total elimination of the aflatoxin $B_1$ present.

Since the time of treatment depends upon many variable conditions, it is not possible to set forth absolute numerical time limits which would be applicable to all materials which might be amenable to this process. In any specific application, the most effective time of treatment is readily determined by employing the treatment for preliminary "test" periods on small quantities of the material, and subsequently conducting chemical assays on the treated product. The assay method for determining aflatoxin concentration in the treated meals is the method of Pons et al. as described in the Journal Ass. Offic. Anal. Chemists 49, 554–562 (1966). The data resulting from such preliminary runs would provide information relating to the optimum operating parameters applicable to the specific material in question.

It has been determined that the presence of moisture enhances the effectiveness of the ozone treatments in eliminating aflatoxins from contaminated materials. Therefore, it is desirable that moisture be present when materials are to be treated with ozone as described in this invention. For maximum effectiveness of treatment, a moisture level in the material of about from 15% to 30% is considered desirable. If the material to be treated is inherently low in moisture content, it generally will be necessary to supply additional water to the material in order that the total moisture level will conform to the desired range.

After treating materials with ozone as herein described, a final and simple aeration procedure is readily carried out to remove any excess moisture or remaining gaseous reagent from th treated product. This may be accomplished in various ways, for example by simple airdrying the treated material spread in thin layers for about 48 hours at ambient temperatures, by exposing to streams of hot air such as are obtained in mechanical convection ovens, by warming in a vacuum, or by purging with nitrogen or other inert gas.

In general, the instant invention can best be described as a process for chemically inactivating aflatoxins in oilseed meals selected from the group consisting of peanut meal, and cottonsed meal, comprising:

(a) Charging a vessel—equipper with agitator, reflux condenser, and an aperture needed in step (d)—with oilseed meal to be detoxified, (b) Adding a quantity of distilled water to the charged vessel sufficient to yield an aqueous mixture containing about from 22% to 30% water, (c) Agitating and gently heating the aqueous mixture to about 75° C. thereafter continuing the agitation and maintaining the temperature level, (d) Introducing through the aperture of (a) into the agitating and heating aqueous mixture of (c) a stream of ozonized air at a level of about 25 mg. of ozone per minute in a total gas effluent rate of 850 ml., for periods of time about from 60 to 120 minutes, at temperatures about from 75° to 100° C., and (e) Discharging the vessel onto a relatively flat surface and spreading the ozonized meal in thin layers to allow the material to air-dry for about 48 hours.

EXAMPLE 1

The starting material was a sample of aflatoxin contaminated peanut meal of domestic commercial origin. Chemical assay of this meal revealed a total aflatoxin content of 82 p.p.b. Moisture content was determined to be 7.2% as received. The treatment was performed on a bench-scale reactor, provided with a suitable cover and a reflux condenser vented to a hood. The reactor was equipped with an agitator and heat was applied by means of circulating heated water through an outer jacket. Ozonized air was introduced into the system during treatment by means of a tube inlet in the reactor cover, which terminated about 1.5 cm. from the vessel bottom, thus allowing for admission of reaction gas deep into the meal charge. The ozone generating equipment was so adjusted as to produce approximately 25 mg. of ozone per minute in a total gas effluent rate of 850 ml. per minute. In this example a 700 gram portion of the meal was heated for 60 minutes at 75° C. in the presence of added water which, based on the weight of the meal used, resulted in a total moisture content of 30%. Ozonized air as described above was flowed through the meal during the period of treatment. After treatment, the meal was spread in thin layers and allowed to air-dry for 48 hours. Assay of the treated meal for aflatoxin (by the Pons et al. method) indicated a total aflatoxin content of 35 p.p.b.

EXAMPLE 2

The starting material in this example was a 700 gm. sample of aflatoxin contaminated peanut meal as used in Example 1. All operating conditions were similar also to those described in Example 1 with the exception that the reaction temperature used in this case was 100° C. The assay of treated meal from this example revealed a total residual aflatoxin content of only 18 p.p.b.

EXAMPLE 3

The starting material was a sample of aflatoxin contaminated cottonseed meal of domestic commercial origin. Chemical assay of this meal revealed a total aflatoxin content of 210 p.p.b. Moisture content was determined to be 6.6% as received. In this example sufficient additional water was admixed with the meal to achieve a final total moisture content of 22% in the meal. Treatment was carried out on a 700 gm. portion of this meal in the bench-scale reactor described in Example 1 for a period of 120 minutes at 75° C. Ozonized air as described in Example 1 was flowed through the meal during the period of treatment. Following the treatment, the meal was spread in thin layers and allowed to air-dry for 48 hours. Assay of the treated meal for aflatoxin indicated a total aflatoxin content of 104 p.p.b.

EXAMPLE 4

The starting material in this example was a 700 gm. sample of aflatoxin contaminated cottonseed meal as used in Example 3. All operating conditions were similar also to those described in Example 3 with the exception that the reaction temperature used in this case was 100° C. The assay of treated meal from this example revealed a total aflatoxin content of 20 p.p.b.

We claim:

1. A process for chemically inactivating aflatoxins in oilseed meals selected from the group consisting of peanut meal and cottonseed meal, comprising:

(a) charging a vessel—equipped with agitator, reflux condenser, and an aperture needed in step (d)—with oilseed meal to be detoxified, (b) adding a quantity of distilled water to the charged vessel sufficient to yield an aqueous mixture containing about from 22% to 30% water, (c) agitating and gently heating the aqueous mixture to about 75° C. thereafter continuing the agitation and maintaining the temperature level, (d) introducing through the aperture of (a) into the agitating and heating aqueous mixture of (c) a stream of ozonized air at a level of about 25 mg. of ozone per minute in a total gas effluent rate of 850 ml., for periods of time about from 60 to 120 minutes, at temperatures about from 75° to 100° C., and (e) discharging the vessel onto a relatively flat surface and spreading the ozonized meal in thin layers to allow the material to airdry for about 48 hours.

2. The process of claim 1 wherein the oilseed meal is peanut meal.

3. The process of claim 1 wherein the oilseed meal is cottonseed meal.

References Cited

UNITED STATES PATENTS

| | | | |
|---|---|---|---|
| 2,987,399 | 6/1961 | Goering | 99—2 |
| 3,506,452 | 4/1970 | Arthur Jr. et al. | 99—17 |

NORMAN YUDKOFF, Primary Examiner

C. P. RIBANDO, Assistant Examiner

U.S. Cl. X.R.

99—228, 17